US005671460A

United States Patent [19]

Okada et al.

[11] Patent Number: 5,671,460

[45] Date of Patent: Sep. 23, 1997

[54] EXPOSING APPARATUS

[75] Inventors: Tadanori Okada; Yuji Kuwabara, both of Fukaya, Japan

[73] Assignee: Kabushiki Kaisha Toshiba, Kawasaki, Japan

[21] Appl. No.: 413,222

[22] Filed: Mar. 30, 1995

[30] Foreign Application Priority Data

Mar. 31, 1994 [JP] Japan .................................... 6-062804

[51] Int. Cl.$^{6}$ .................................................... G03B 41/00

[52] U.S. Cl. ............................................................. 396/547

[58] Field of Search ................................ 354/1; 396/546, 396/547

[56] References Cited

U.S. PATENT DOCUMENTS

| | | | |
|---|---|---|---|
| 3,736,848 | 6/1973 | Tsuneta et al. | 354/1 |
| 3,810,196 | 5/1974 | Barten | 354/1 |
| 3,883,880 | 5/1975 | Yamazaki et al. | 354/1 |
| 4,001,018 | 1/1977 | Tsuneta et al. | 354/1 |
| 4,013,467 | 3/1977 | Hosokoshi et al. | 354/1 |
| 5,570,145 | 10/1996 | Soneda | 396/547 |

FOREIGN PATENT DOCUMENTS

| | | | |
|---|---|---|---|
| 0 294 867 | 12/1988 | European Pat. Off. | H01J 9/227 |
| 0 400 629 | 12/1990 | European Pat. Off. | H01J 9/227 |
| 0 415 286 | 3/1991 | European Pat. Off. | H01J 29/00 |
| 0 646 940 | 4/1995 | European Pat. Off. | H01J 9/227 |
| 62-17925 | 1/1987 | Japan . | |

*Primary Examiner*—Safet Metjahic
*Assistant Examiner*—John Chizmer
*Attorney, Agent, or Firm*—Cushman Darby & Cushman Intellectual Property Group of Pillsbury Madison & Sutro LLP

[57] ABSTRACT

In an exposing apparatus for forming a phosphor screen on the inner surface of a panel of a color cathode ray tube by exposure, a photosensitive layer is coated on the inner surface of the panel, and this panel is supported on a support table. Light rays that print a pattern corresponding to the apertures of a shadow mask are emitted from a light source unit, and the light rays are incident on a projection lens system, that guides the light rays to approximate the locus of an electron beam, through a correcting optical member. The light rays passing through the projection lens system are incident on the photosensitive layer through the apertures of the shadow mask. The correcting optical member has a light exit surface inclined with respect to its incident surface, and is rotated by a driving unit to rotate about the optical axis of the light rays, emitted from the light source unit toward the photosensitive layer, as the central axis. Therefore, the image of the light source unit is shifted by rotation, and the pattern of the aperture of the shadow mask which is close to a true circle is formed on the photosensitive layer. As a result, the landing margin can be set large, thereby manufacturing a color cathode ray tube whose color purity can be easily adjusted.

3 Claims, 4 Drawing Sheets

EXPOSING APPARATUS

BACKGROUND OF THE INVENTION

1. Field of the Invention

The present invention relates to an exposing apparatus and, more particularly, to an exposing apparatus which forms a phosphor screen on the face plate of a color cathode ray tube by exposure.

2. Description of the Related Art

Generally, in a cathode ray tube, a phosphor screen 3 consisting of phosphor layers of three different colors is formed on the inner surface of a panel 2 to oppose a shadow mask 1, as shown in FIG. 1. Three electron beams 5B, 5G, and 5R emitted by an electron gun 4 are correctly incident on the corresponding phosphor layers of the three different colors as they are selected by the shadow mask 1. When the phosphor screen 3 is scanned by the electron beams to emit light rays, a color image is displayed on the phosphor screen 3.

In this color cathode ray tube, circular apertures through which the electron beams pass are formed in the shadow mask 1. As shown in FIGS. 2A and 2B, dot type phosphor layers 6B, 6G, and 6R of three different colors are arranged such that they are in close contact with each other. Alternatively, as shown in FIGS. 3A and 3B, dot type phosphor layers 6B, 6G, and 6R of three different colors are buried in the matrix holes of a black matrix type light-absorbing layer 7 to form a black matrix type phosphor screen.

Conventionally, the phosphor screens of these color cathode ray tubes are formed in accordance with photographic printing. For example, to form the black matrix type phosphor screen shown in FIGS. 3A and 3B, a sensitizing solution containing polyvinyl alcohol (PVA) and ammonium dichromate (ADC) as major components is coated on the inner surface of a panel 2, and dried, thus forming a photosensitive film 9, as shown in FIG. 4A. The photosensitive film 9 is exposed through a shadow mask 1 to print a pattern corresponding to a circular aperture 10 in the shadow mask 1 on the photosensitive film 9. Thereafter, the photosensitive film 9 printed with this pattern is developed to remove its non-photosensitive portion, thereby forming a resist film 11 comprising a dot pattern, as shown in FIG. 4B. Subsequently, a light-absorbing paint is coated on the inner surface of the panel 2 on which the resist film 11 is formed, and is dried, to form a light-absorbing paint layer 12, as shown in FIG. 4C. The light-absorbing paint layer 12 coated on the resist film 11 is separated together with the resist film 11, thus forming a light-absorbing layer 7 in which matrix holes 13 are formed at positions where phosphor dots should be formed, as shown in FIG. 4D.

Then, a photosensitive phosphor slurry containing an arbitrary phosphor, e.g., blue phosphor, PVA, and ADC as major components is coated on the inner surface of the panel 2 on which the light-absorbing layer 7 is formed, and is dried, to form a photosensitive phosphor slurry layer 15, as shown in FIG. 4E. The photosensitive phosphor slurry layer 15 is exposed through the shadow mask 1, so as to print a pattern corresponding to the circular aperture 10 of the shadow mask 1 on the photosensitive phosphor slurry layer 15. Subsequently, the photosensitive phosphor slurry layer 15 on which this pattern is to be printed is developed to remove its non-photosensitive portion, thereby forming a dot type blue phosphor layer 6B in a predetermined matrix hole formed in the light-absorbing layer 7, as shown in FIG. 4F. This step of forming the blue phosphor layer 6B is repeated for green and red phosphors, so that a dot type green phosphor layer 6G and a red phosphor layer 6R are formed in predetermined matrix holes formed in the light-absorbing layer 7, as shown in FIG. 4G.

Regarding the phosphor screen shown in FIG. 2B which does not have a light-absorbing layer, it is formed by sequentially repeating the steps of forming the blue, green, and red phosphor layers described above.

In the steps of forming the phosphor screen, to expose a photosensitive member which forms the phosphor screen comprising the photosensitive film 9 for forming the light-absorbing layer 7, the photosensitive phosphor slurry layer 15, and the like, an exposing apparatus shown in FIG. 5 is conventionally used. In this exposing apparatus, a light source unit 18 is provided under a support table 17 that supports a panel 2 at a predetermined position. An optical lens system 20 comprising a correction lens and the like for guiding a ray of light 19 emitted by the light source unit 18 along an approximate locus of an electron beam, a correction filter 21 for correcting the distribution of the quantity of light on the inner surface of the panel 2 arranged at a predetermined position on the support table 17, and the like are arranged above the light source unit 18. Ordinarily, a light source 22 comprising a straight tube type arc mercury lamp is arranged in the light source unit 18, and the arc mercury lamp is cooled by water cooling. A light-shielding plate 24 in which a slit 23 that substantially controls the size of the light source 22 is arranged in the light source unit 18. The widthwise direction of the slit 23 of the light-shielding plate 24 is aligned with the axial direction of the light source 22. Referring to FIG. 5, reference numeral 26 denotes a photosensitive member 26 formed on the inner surface of the panel 2 to form a phosphor screen.

When a pattern corresponding to the apertures of the shadow mask 1 is printed, with this exposing apparatus, on the photosensitive member formed on the inner surface of the panel to form a phosphor screen, thus forming dot type three-color phosphor layers or a black matrix type light-absorbing layer, the shapes of the three-color phosphor layers or of the matrix holes of the light-absorbing layer largely depend on the shape of the light source 22, the optical lens system 20, the shape of the apertures of the shadow mask, the substantial shape of the inner surface of the panel 2, and the like. In order to form a color cathode ray tube whose color purity can be easily adjusted by increasing the landing margin of the electron beam, the three-color phosphor layers or the matrix holes of the light-absorbing layer are preferably formed as true circles having a high density. For this purpose, regarding the light source 22, the width of the slit 23 of the light-shielding plate 24, that determines the size of the arc mercury lamp in the axial direction, i.e., the length of the arc mercury lamp, and the diameter of the discharge arc that determines the size of the arc mercury lamp in a direction perpendicular to the axial direction must be set almost equal to each other. When the relationship between the width of the slit 23 of the light-shielding plate 24, that determines the size of the arc mercury lamp in the axial direction, and the diameter of the discharge arc becomes inappropriate, the dot type three-color phosphor layers or the matrix holes of the light-absorbing layer do not form circles close to true circles.

In order to solve the above problem, an exposing apparatus is known, in which the arc mercury lamp is intermittently moved in the direction of its tube axis to perform oscillation or an elliptic motion, and a pattern corresponding to the circular apertures of the shadow mask which is to be printed on a photosensitive member that forms a phosphor screen forms substantially true circles.

Meanwhile, to expose a photosensitive member, which is formed on the inner surface of the panel to form a phosphor screen, within a short exposure time in order to increase the productivity, the quantity of emitted light must be increased. However, regarding the arc mercury lamp, although its size in the axial direction can be increased by increasing the width of the slit of the light-shielding plate, it is difficult to increase the diameter of the discharge arc in the direction perpendicular to the axial direction.

Therefore, regarding exposure for forming dot type three-color phosphor layers or matrix holes of a light-absorbing layer, in order to increase the width of the slit of the light-shielding plate and to form a true-circle pattern corresponding to the circular apertures of the shadow mask which is to be printed on the photosensitive member formed on the inner surface of the panel to form a phosphor screen, the light source unit is rotated about the optical axis of the ray of light, emitted through the slit, as the rotation axis. However, even when exposure is performed by rotating the light source unit, since the light-shielding plate is arranged far from the light source, the light source apparently varies when it is seen from a specific aperture of the shadow mask in accordance with rotation of the light source unit. Therefore, the pattern corresponding to the circular apertures of the shadow mask which is to be printed on a photosensitive member, which is formed on the inner surface of the panel to form the phosphor screen, does not form true circles.

SUMMARY OF THE INVENTION

It is an object of the present invention to provide an exposing apparatus that can print a pattern corresponding to the circular apertures of a shadow mask on a photosensitive member, which is formed on the inner surface of a panel to form a phosphor screen, to have a shape close to a true circle.

It is an another object of the present invention to provide an exposing apparatus for transferring pattern images corresponding to the circular apertures of a shadow mask on a photosensitive member to form matrix holes each having a substantially circular shape on a phosphor screen, which is formed on the inner surface of a panel, without involving any complex elliptical motion or using any slit of complex configuration.

In an exposing apparatus for forming a phosphor screen of a color cathode ray tube, assume that a light source unit is arranged to oppose a photosensitive member formed on the inner surface of a panel to form the phosphor screen, and emits light rays in order to print, on the photosensitive member that forms the phosphor screen, a pattern corresponding to the apertures of a shadow mask. A correcting optical member is arranged between the light source unit and the shadow mask. The correcting optical member has an inclined flat or curved surface whose thickness is non-uniform in the transmitting direction of light rays emitted from the light source unit toward the photosensitive member that forms the phosphor screen. The correcting optical member is driven by a driving unit to rotate about a rotational axis which is substantially coincident with the optical path of the light rays, emitted from the light source unit toward the photosensitive member that forms the phosphor screen.

The correcting optical member has a shape with an inclined curved surface which is set based on the ratio of the major axis to the minor axis of the uncorrected pattern corresponding to the aperture of the shadow mask which is to be printed on the photosensitive member that forms the phosphor screen, the uncorrected pattern being formed when the exposing apparatus has no correcting optical member.

As described above, the correcting optical member, which has an inclined flat or curved surface whose thickness is non-uniform in the transmitting direction of the light rays emitted from the light source unit toward the photosensitive member which is formed on the inner surface of the panel to form the phosphor screen, is arranged between the light source unit and the shadow mask. The correcting optical member is driven by the driving unit to rotate about a rotational axis which is substantially coincident with the optical axis of the light rays, emitted from the light source unit toward the photosensitive member that forms the phosphor screen. In this exposing apparatus, the locus of the light rays, which are emitted from the light source and reach the photosensitive member that forms the phosphor screen through an arbitrary aperture of the shadow mask, changes in accordance with a change in refraction caused by a change in thickness or curved surface of the rotating correcting optical member, so that the light rays are incident on the aperture of the shadow mask in different angles. As a result, as the correcting optical member rotates, the pattern of the apertures of the shadow mask which is projected on the photosensitive member that forms the phosphor screen is rotated, so that a pattern corresponding to the aperture of the shadow mask which is to be printed on the photosensitive member that forms the phosphor screen can form substantially true circles.

When the correcting optical member is formed to have an inclined curved surface which is set based on the ratio of the major axis to the minor axis of the uncorrected pattern corresponding to the aperture of the shadow mask which is to be printed on the photosensitive member that forms the phosphor screen, the pattern corresponding to the apertures of the shadow mask which is to be printed on the photosensitive member that forms the phosphor screen can be set more precisely to form true circles.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Exposing apparatuses according to preferred embodiments of the present invention will be described with reference to the accompanying drawings.

Figure 1:
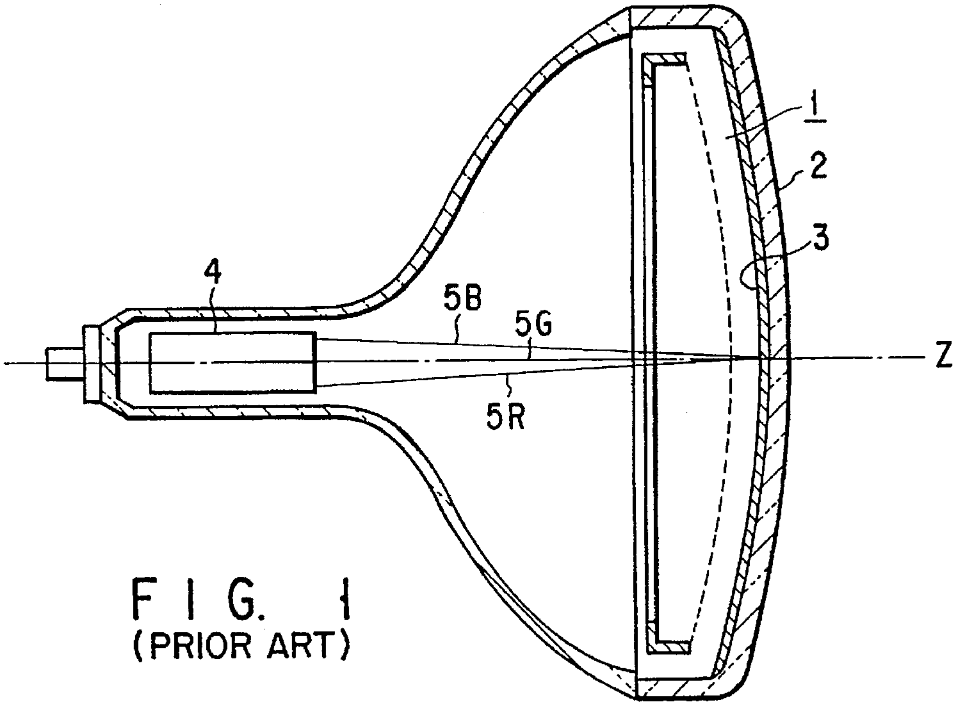
FIG. 1 (PRIOR ART)
FIG. 1 is a sectional view schematically showing the structure of a color cathode ray tube.
Figure 2A:
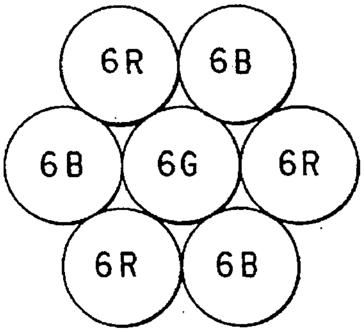
FIG. 2A (PRIOR ART)
FIGS. 2A and 2B are plan and sectional views, respectively, of a phosphor screen comprising dot type phosphor layers.
Figure 2B:
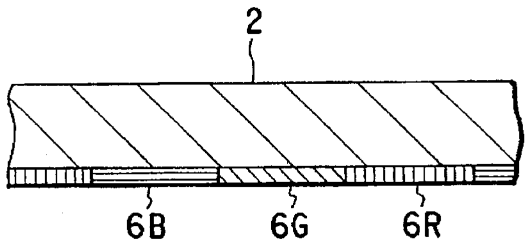
FIG. 2B (PRIOR ART)
Figure 3A:
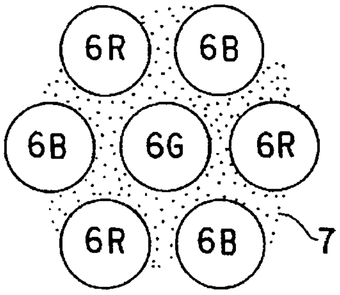
FIG. 3A (PRIOR ART)
FIGS. 3A and 3B are plan and sectional views, respectively, of a phosphor screen in which dot type phosphor layers are buried in the matrix holes of a black matrix type light-absorbing layer.
Figure 3B:
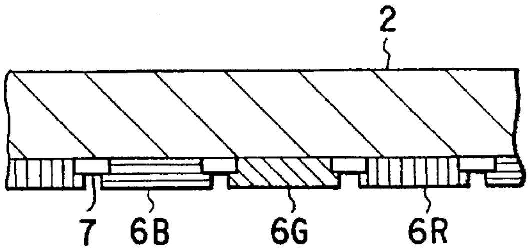
FIG. 3B (PRIOR ART)
Figure 4A:
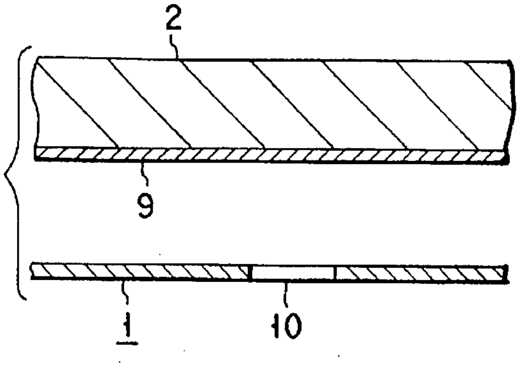
F I G. 4A (PRIOR ART)
FIGS. 4A to 4G are sectional views showing the respective manufacturing steps in order to explain a method of forming a phosphor screen in which dot type phosphor layers are buried in the matrix holes of a black matrix type light-absorbing layer.
Figure 4E:
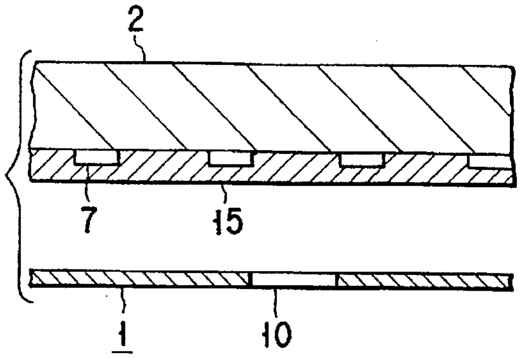
F I G. 4E (PRIOR ART)
Figure 4B:
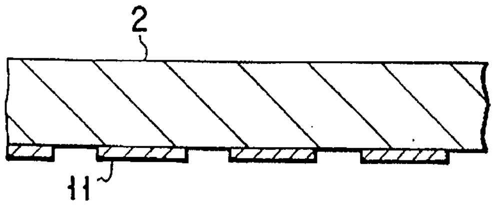
F I G. 4B (PRIOR ART)
Figure 4F:
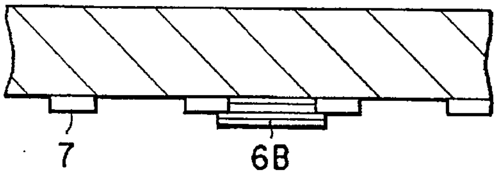
F I G. 4F (PRIOR ART)
Figure 4C:
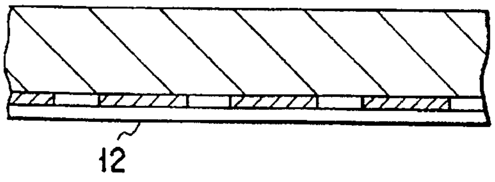
F I G. 4C (PRIOR ART)
Figure 4D:
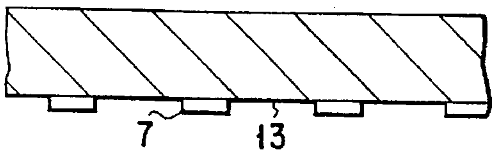
F I G. 4D (PRIOR ART)
Figure 4G:
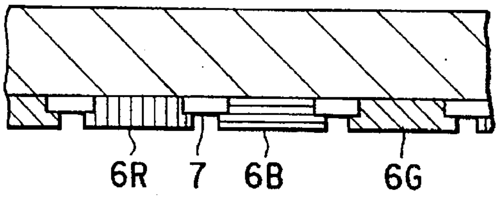
F I G. 4G (PRIOR ART)
Figure 5:
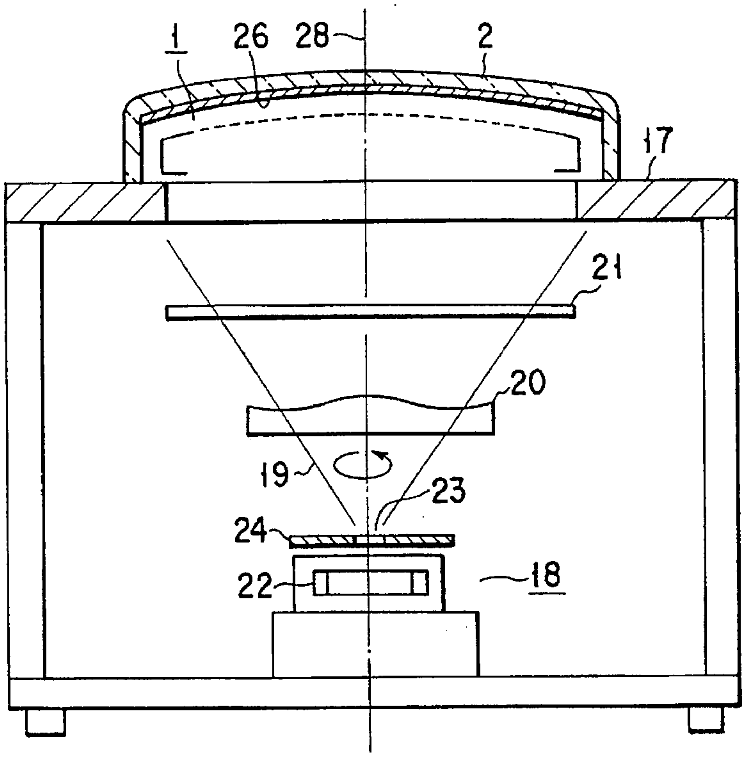
FIG. 5 (PRIOR ART)
FIG. 5 is a schematic sectional view showing the structure of a conventional exposing apparatus that forms a phosphor screen by exposing a photosensitive member on the face plate of a color cathode ray tube.
Figure 6:
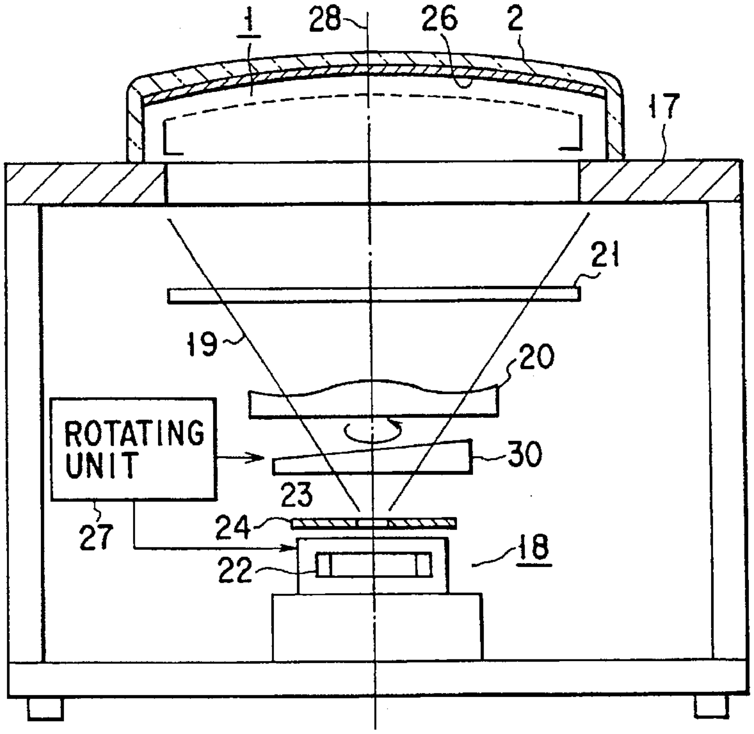
FIG. 6 is a sectional view showing the structure of an exposing apparatus according to an embodiment of the present invention, which forms a phosphor screen by exposing a photosensitive member on the face plate of a color cathode ray tube.

FIG. 6 shows an exposing apparatus according to an embodiment of the present invention. A support table 17 for positioning and supporting a panel 2 is provided to this exposing apparatus, and a light source unit 18 for generating an exposing ray of light is set under the support table 17. An optical lens system 20 comprising a correction lens and the like is arranged between the light source unit 18 and the panel 2. A ray of light 19, which is emitted by the light source unit 18 toward a photosensitive member 26 formed on the inner surface of the panel 2 positioned and supported by the support table 17 to form a phosphor screen, is guided by the optical lens system 20 to approximate the locus of an electron beam emitted by the electron gun of a color cathode ray tube. A correction filter 21, that corrects the distribution of the intensity of light on the inner surface of the panel 2 positioned and supported by the support table 17, is arranged between the light source unit 18 and the panel 2. The light source unit 18 has a straight tube type arc mercury lamp as its light source 22, and a light-shielding plate 24 in which a slit 23 whose widthwise direction is aligned with the direction of the tube axis of the arc mercury lamp is provided at a remote position above the light source 22.

Figure 7:
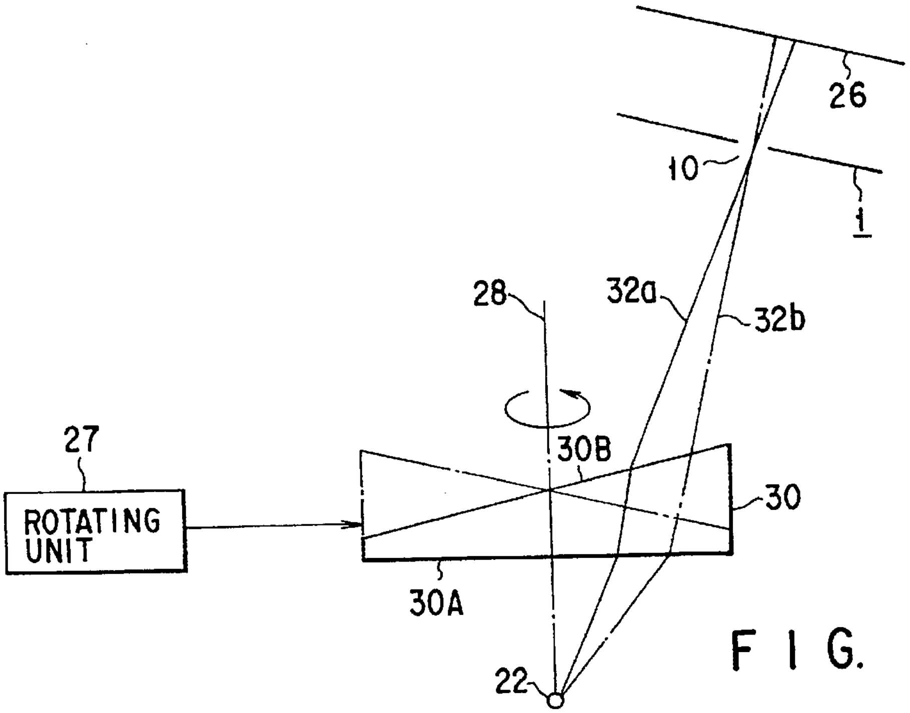
FIG. 7 is a view for explaining a change in locus of a ray of light passing through a correcting optical member of the exposing apparatus shown in FIG. 6.

Furthermore, in this exposing apparatus, a correcting optical member 30 is arranged between the light source 22 and a shadow mask 1 mounted on the panel 2 positioned and supported by the support table 17, preferably between the light source 22 and the optical lens system 20. The light rays 19, emitted by the light source unit 18 toward the light-shielding plate 24 passes through the correcting optical member 30. The correcting optical member 30 is made of a transparent refracting material into a prism having an inclined flat surface whose thickness in the transmitting direction, i.e., its plate thickness, changes. As shown in FIG. 7, this correcting optical member 30 has a flat incident surface 30A on which the ray of light from the light source is incident, and a flat exit surface 30B inclined with respect to the incident surface 30A. An angle between the incident and exit surfaces 30A, 30B is determined based on the ratio of the major axis to the minor axis of a uncorrected pattern corresponding to the aperture of the shadow mask, the uncorrected pattern being formed when no correcting optical member 30 is used. The correcting optical member 30 is driven by a driving or rotating unit 27 about a rotational axis which is substantially coincident with an optical axis 28 of the rays of light 19, emitted from the light source unit 18 toward the photosensitive member 26 that forms the phosphor screen, and rotates at a predetermined rotational frequency as indicated by an arrow in FIG. 6. The optical axis 28 coincides with the central axis of the panel 2. In the optical system shown in FIG. 7, the correcting optical member 30 is arranged such that the optical axis 28 passes substantially perpendicularly to the incident surface 30A. In this embodiment, the light source unit 18 may be rotated by the rotating unit 27. In this case, the correcting optical member 30 is also rotated by the rotating unit 27 in accordance with the rotation of the light source unit 18.

Figure 8:
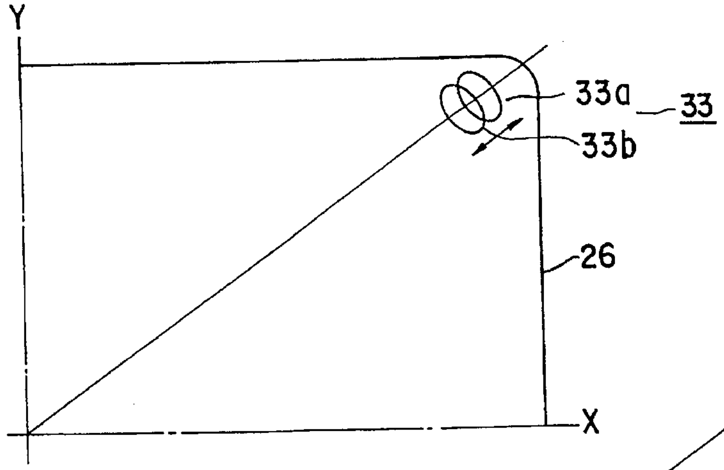
FIG. 8 is a diagram for explaining movement of the pattern of an aperture of a shadow mask which is projected on a photosensitive member formed on the inner surface of the panel in the exposing apparatus shown in FIG. 6 to form a phosphor screen.
Figure 9:
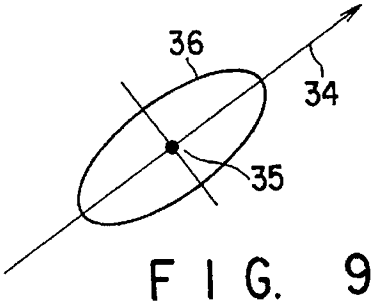
FIG. 9 is a diagram for explaining a locus formed by the pattern of the aperture of the shadow mask which is projected on the photosensitive member formed on the inner surface of the panel in the exposing apparatus shown in FIG. 6 to form the phosphor screen.

In this manner, the correcting optical member 30 having the inclined flat surface 30B is arranged between the light source 22 and the shadow mask 1 mounted on the panel 2, and the correcting optical member 30 is rotated about the optical axis 28 of the light rays 19, emitted from the light source unit 18. In FIG. 7, the light source 22 is assumed to be a point light source. FIG. 7 shows the loci of the light rays obtained when the correcting optical member 30 is arranged at a certain position and is rotated through 180° from this certain position. As shown in FIG. 7, the light rays 19 that reaches the photosensitive member 26, that forms the phosphor screen, through an arbitrary one aperture 10 in the shadow mask 1 travels along a locus 32*a* indicated by a solid line when it passes through a thin portion of the correcting optical member 30, and a different locus 32*b* indicated by an alternate long and short dash line when it passes through a thick portion of the correcting optical member 30. More specifically, as shown in FIG. 7, the light rays for exposing a certain aperture pattern of the shadow mask are incident on the incident surface 30A at different incident positions in accordance with the rotating angles of the correcting optical member 30, are refracted by the incident surface 30A to pass through the optical member with different optical path lengths, are refracted at different exit positions on the exit surface 30B, and are directed toward the arbitrary one aperture 10 of the shadow mask 1 in different directions. As a result, as shown in FIG. 8, the aperture pattern 33 of the shadow mask projected on the photosensitive member 26 that forms the phosphor screen is shifted in the radiating direction of the panel 2, i.e., in the diagonal direction of the panel, such that the light rays form a pattern 33*a* when the light rays pass through the thin portion of the correcting optical member 30 and the light rays form a pattern 33*b* when the light rays pass through the thick portion of the correcting optical member 30. The movement of the aperture pattern 33 of the shadow mask projected on the photosensitive member that forms the phosphor screen changes over time in accordance with the rotation of the correcting optical member 30. During one turn of the correcting optical member 30, a line 34 connecting the aperture of the shadow mask and the center of the light source 22 forms a substantially elliptic locus 36 intersecting the inner surface of the panel 2, and having a point 35 as the center and the radiating direction of the panel 2 as the major axis, as shown in FIG. 9.

In an exposure process, images of the light source 22 are moved within a predetermined range, by rotating the correcting optical member 30, so that exposing intensity distributions of the light rays passing through the apertures of the shadow mask can be adjusted on the respective points on the panel with a phosphor screen exposure period. Thus, images of the apertures can be exposed on the photosensitive member to form matrix holes each having substantially circular shape, without involving any complex elliptical motion or using any slit of complex configuration.

The ratio of the major axis to the minor axis of the elliptic locus 36 formed on the photosensitive member that forms the phosphor screen can be adjusted by changing the angle of inclination of the inclined flat surface 30B of the correcting optical member 30 with respect to the incident surface 30A. Therefore, when the angle of inclination of the inclined flat surface 30B of the correcting optical member 30 is appropriately set, the pattern corresponding to the aperture of the shadow mask to be printed on the photosensitive member that forms the phosphor screen can be formed into a shape close to a true circle without elliptically rotating or tilting the rotating unit 27. Then, the landing margin of the electron beam on the phosphor screen in which there are formed dot type three-color phosphor layers or three-color phosphor layers formed in the matrix holes of a black matrix type light-absorbing layer, can be set large, thereby providing a color cathode ray tube whose color purity can be easily adjusted. In this exposing apparatus, the light source unit may be rotated around the optical axis or may be fixed.

An exposing apparatus according to another embodiment will be described.

Figure 10:
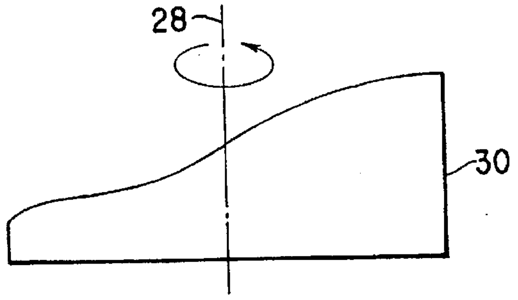
FIG. 10 is a sectional view showing part of the correcting optical member having an inclined curved surface in the exposing apparatus shown in FIG. 6.

FIG. 10 shows a correcting optical member 30 as a major constituent element of the exposing apparatus according to this other embodiment of the present invention. The arrangement of this exposing apparatus is substantially the same as that of the exposing apparatus shown in FIG. 6, and a detailed description thereof will be omitted.

Unlike the correcting optical member having the inclined flat surface 30B of the above embodiment, the exit surface 30B of the correcting optical member 30 of this embodiment, forms an inclined curved surface having different optical path lengths depending on the transmitting directions of the light rays emitted from the light source unit. More specifically, the exit surface 30B of the correcting optical member 30 forms a curved surface. This inclined curved surface 30B is determined based on the ratio of the major axis to the minor axis of an uncorrected pattern corresponding to an aperture of a shadow mask which is to be printed, by an exposing apparatus which does not have a conventional correcting optical member, on a photosensitive member formed on the inner surface of a panel to form a phosphor screen. The inclined curved surface 30B is set such that the pattern of the aperture of the shadow mask projected on the photosensitive member that forms the phosphor screen forms an optimum locus on a position on the inner surface of the panel.

In an exposing apparatus in which the correcting optical member 30 having this inclined curved surface 30B is arranged above the light source unit and rotated about an optical axis 28 of the light rays, emitted from the light source unit toward the photosensitive member formed on the inner surface of the panel to form the phosphor screen, the pattern corresponding to the aperture of the shadow mask which is to be printed on the photosensitive member that forms the phosphor screen can be controlled more precisely than in a correcting optical member having a flat inclined surface throughout the entire inner surface of the panel. Thus, the landing margin of the electron beam can be set large, thereby providing a color cathode ray tube whose color purity can be easily adjusted.

The exit surface 30B of the correcting optical member 30 is formed with a curved surface inclined in one direction. When the exit surface 30B is formed with a curved surface which is inclined also in a direction perpendicular to this direction so that it appropriately controls the pattern corresponding to the aperture of the shadow mask, the pattern corresponding to the aperture of the shadow mask, which is to be printed on the photosensitive member that forms the phosphor screen, can be set to take various loci.

In this embodiment, the correcting optical member has an inclined flat or curved surface having different transmitting optical paths for the light rays emitted from the light source unit. However, this inclined surface can be arbitrarily formed with a combination of a flat surface and a curved surface. In addition, the light source unit may be rotated around the optical axis or may be fixed.

In an exposing apparatus for forming a phosphor screen of a color cathode ray tube, assume that a correcting optical member is arranged between a light source unit and a shadow mask. The light source unit is arranged to oppose a photosensitive member that forms the phosphor screen, and emits light rays in order to print, on the photosensitive member formed on the inner surface of a panel for forming the phosphor screen, a pattern corresponding to the aperture of the shadow mask. The correcting optical member has an inclined flat or curved surface whose thickness is non-uniform in the transmitting direction of the ray of light emitted from the light source unit toward the photosensitive member that forms the phosphor screen. The correcting optical member is driven by a driving unit to rotate about a rotational axis which is substantially coincident with the optical axis of the ray of light, emitted from the light source unit toward the photosensitive member that forms the phosphor screen. Then, the locus of the ray of light, which is emitted from the light source and reaches the photosensitive member that forms the phosphor screen through an arbitrary aperture of the shadow mask, changes in accordance with a change in thickness of the rotating correcting optical member, so that the ray of light is incident on the aperture of the shadow mask in different angles. As a result, as the correcting optical member rotates, the pattern of the aperture of the shadow mask, which is projected on the photosensitive member that forms the phosphor screen, moves apparently, so that a pattern corresponding to the aperture of the shadow mask which is to be printed on the photosensitive member that forms the phosphor screen can be formed close to a true circle. Thus, the landing margin of the electron beam can be set large, thereby providing a color cathode ray tube whose color purity can be easily adjusted.

When the correcting optical member has an inclined curved surface 30B which is set based on the ratio of the major axis to the minor axis of the uncorrected pattern corresponding to the aperture of the shadow mask which is to be printed on the photosensitive member, by using no correcting optical member, that forms the phosphor screen, the pattern corresponding to the aperture of the shadow mask which is to be printed on the photosensitive member that forms the phosphor screen can be controlled more precisely to form a true circle. Thus, the landing margin of the electron beam can be large, thereby providing a color cathode ray tube whose color purity can be easily adjusted.

In addition, if a thickness-varying inclined flat surface or inclined curved surface of a correcting optical member is so designed as to correspond to a ratio between a minor axis and a major axis of a respective matrix hole in the inner surface of a panel, a respective matrix hole of true circularity can be formed irrespective of the pattern of a light source at a time of exposure. That is, such control can be achieved in any proper way by the designing of a specific lens surface irrespective of any pattern the light source provides.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An exposing apparatus for exposing a photosensitive layer coated on an inner surface of a panel of a color cathode ray tube with a pattern corresponding to apertures of a shadow mask mounted in said panel, thereby forming a phosphor screen, comprising:

means for supporting said panel;

a light source unit for emitting light rays toward said photosensitive layer so as to print thereon said pattern corresponding to one of said apertures of said shadow mask;

an optical system including a correcting optical member which is arranged between said light source unit and said shadow mask and through which said light rays emitted from said light source unit pass toward said photosensitive layer, said correcting optical member having an incident surface on which said light rays are incident and an exit surface from which said light rays exit, and said exit surface being curved and inclined with respect to said incident surface, so that light rays which are incident at different incident positions on said incident surface pass through said correcting optical member with different optical path lengths and exit from said exit surface, wherein said light exit surface is an inclined curved surface having a shape based on a ratio of a major axis to a minor axis of a pattern corresponding to said one of said apertures of said shadow mask, which is to be printed on a photosensitive member, when said correcting optical member is not arranged in said optical system; and a driving unit for rotating said correcting optical member about a rotational axis which is substantially coincident with an optical axis of said light rays, emitted from said light source unit toward said photosensitive layer.

2. An apparatus according to claim 1, wherein said light source unit includes an elongated light source for emitting light rays extending perpendicularly to the optical axis and an elongated slit for limiting passage of the light rays emitted from said elongated light source.

3. An apparatus according to claim 1, wherein said optical system includes:

a projection lens system for projecting said light rays emitted from said light source toward said photosensitive layer along a predetermined locus; and a filter for correcting a distribution of intensity of light rays on said photosensitive layer.

* * * * *